(12) United States Patent
Zhang

(10) Patent No.: US 7,995,974 B2
(45) Date of Patent: Aug. 9, 2011

(54) METHOD AND APPARATUS FOR REVOKING A TALK BURST

(75) Inventor: Wangguang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 470 days.

(21) Appl. No.: 12/178,002

(22) Filed: Jul. 23, 2008

(65) Prior Publication Data

US 2008/0280572 A1 Nov. 13, 2008

Related U.S. Application Data

(63) Continuation of application No. PCT/CN2007/070867, filed on Oct. 10, 2007.

(30) Foreign Application Priority Data

Feb. 27, 2007 (CN) .......................... 2007 1 0079958

(51) Int. Cl.
*H04B 1/38* (2006.01)

(52) U.S. Cl. .... 455/90.2; 455/518; 455/519; 455/67.11; 455/67.16

(58) Field of Classification Search .................. 455/517, 455/518, 519, 90.2, 412.1, 426.1, 422.1, 455/520, 521, 416, 67.11, 67.16; 370/416, 370/328, 498, 352, 260, 447, 401, 254
See application file for complete search history.

(56) References Cited

U.S. PATENT DOCUMENTS

| 7,697,949 B2 * | 4/2010 | Yoshida et al. .............. 455/518 |
| 2002/0150091 A1 * | 10/2002 | Lopponen et al. ........... 370/389 |
| 2004/0077358 A1 * | 4/2004 | Bennett et al. .............. 455/455 |
| 2004/0224678 A1 * | 11/2004 | Dahod et al. ............... 455/426.1 |
| 2006/0046757 A1 * | 3/2006 | Hoover et al. .............. 455/518 |
| 2006/0281482 A1 * | 12/2006 | Yoshida et al. .............. 455/518 |
| 2007/0058573 A1 * | 3/2007 | Schwagmann et al. ....... 370/260 |

(Continued)

FOREIGN PATENT DOCUMENTS

CN 1585521 A 2/2005

(Continued)

OTHER PUBLICATIONS

Anonymous: "Push-to-Talk over cellular (PoC) user plane; transport protocols; PoC Release 1.0, V 1.1.1", Internet Citation [online] xp002321969 retrieved from the internet; http://www.ericsson.com/mobilityworld/develperzonedown/downloads/docs/ims_poc/poc_1_0_transport_protocols.pdf. Last accessed Mar. 22, 2005.

(Continued)

*Primary Examiner* — Tan Trinh
(74) *Attorney, Agent, or Firm* — Brinks Hofer Gilson & Lione

(57) ABSTRACT

An embodiment of the present invention discloses a method for revoking a talk burst, which includes: entering a pending release state by a talk burst after a client having the talk burst releases the talk burst initiatively; monitoring a duration of the talk burst in the pending release state; and revoking the talk burst when the duration of the talk burst in the pending release state exceeds a preset duration. An embodiment also discloses an apparatus for revoking a talk burst. By applying certain embodiments of the present invention, after a client initiatively releases a talk burst so that the talk burst enters a pending release state, the talk burst can be revoked in time and the waiting time of the client is saved.

8 Claims, 1 Drawing Sheet

U.S. PATENT DOCUMENTS

| | | | |
|---|---|---|---|
| 2007/0248040 A1* | 10/2007 | Huh | 370/328 |
| 2007/0274233 A1* | 11/2007 | Ptashek et al. | 370/254 |
| 2009/0141742 A1* | 6/2009 | Huh et al. | 370/498 |
| 2009/0197625 A1* | 8/2009 | Zhang | 455/518 |
| 2010/0151896 A1* | 6/2010 | Yoshida et al. | 455/518 |
| 2010/0167775 A1* | 7/2010 | Huh | 455/518 |

FOREIGN PATENT DOCUMENTS

| | | |
|---|---|---|
| CN | 1585525 A | 2/2005 |
| CN | 1717077 A | 1/2006 |
| CN | 1794833 A | 6/2006 |
| CN | 1805584 A | 7/2006 |
| CN | 1897720 A | 1/2007 |
| CN | 101035322 A | 9/2007 |
| CN | 100493220 C | 5/2009 |
| EP | 1734721 A2 | 12/2006 |
| JP | 2006352322 A | 12/2006 |
| WO | WO 2004062306 A1 | 7/2004 |
| WO | WO 2008104112 A1 | 9/2008 |

OTHER PUBLICATIONS

Written Opinion of the International Searching Authority issued in corresponding PCT Patent Application No. PCT/CN2007/070867, mailed Jan. 17, 2008.

Communication issued in corresponding European Patent Application No. 07817058.6, mailed Oct. 7, 2009.

* cited by examiner

METHOD AND APPARATUS FOR REVOKING A TALK BURST

This application is a continuation of PCT application No. PCT/CN2007/070867 filed Oct. 10, 2007, which claims priority to Chinese patent application No. 200710079958.4 filed Feb. 27, 2007.

FIELD OF THE INVENTION

Embodiments of the present invention relates to the Push to talk over Cellular (PoC) technology, and more particular, to a method and apparatus for revoking a talk burst.

BACKGROUND OF THE INVENTION

PoC is a bidirectional, real-time and multi-party communication mode. It allows a client to communicate with one or more than one client. During a PoC service, a PoC server handles the talk burst control. When several clients participate in one PoC session, at a time, at most one client may have the talk burst, to talk, and other clients may only listen to the client having the talk burst. The client having the talk burst sends media packets that contain speech contents continuously to the PoC server. Each media packet carries a sequence number of the media packet, numbered in an ascending order of transmission.

At present, as specified by the Open Mobile Alliance (OMA), when the PoC service is applied, the client having the talk burst initiatively may release the talk burst by sending a talk burst release message to the PoC server. The client having the talk burst can determine the maximum sequence number of media packets required for the speech content in accordance with the number of the media packets required for the speech content and send the talk burst release message containing the maximum sequence number of media packets to the PoC server. Upon receiving the talk burst release message from the client having the talk burst, the PoC server acquires the maximum sequence number of media packets. The PoC server state for general talk burst changes from a TB_Taken state (TB: talk burst) to a pending TB_Release state. At this time, the client still has the talk burst before the PoC server successfully revokes the talk burst of the client.

When the PoC server state for general talk burst is in the pending TB_Release state, the PoC server revokes the talk burst of the client having the talk burst it a media packet received from the client having the talk burst has a sequence number equal to or greater than the maximum sequence number of media packets sent by the client having the talk burst previously.

In the existing PoC service, however, it the client releases the talk burst initiatively so that the talk burst is in a pending release state, the maximum sequence number of media packets sent by the client having the talk burst is too large or the client having the talk burst continues to send media packets with smaller sequence numbers after the maximum sequence number of media packets is sent. As a result, the PoC server does not receive a media packet whose sequence number is equal to or greater than the maximum sequence number of media packets sent by the client having the talk burst within a long time. Consequently, the talk burst of the client having the talk burst can't be revoked in time.

In addition, the PoC server may decide whether to revoke a talk burst by using a speech mute timer and a speech duration timer.

The timing durations of the speech mute timer and the speech duration timer are configurable.

The speech mute timer is adapted to monitor the duration without speech input from the client having the talk burst. It starts when the PoC server state for general talk burst transits to a TB_Taken state and there is no speech input from the client having the talk burst. It the speech mute timer expires, which indicates that the client having the talk burst has not input speech within a set duration, the PoC server revokes the talk burst of the client having the talk burst. When the PoC server revokes the talk burst of the client having the talk burst, the speech mute timer is disabled.

The speech duration timer is adapted to monitor the total speech duration of the client having the talk burst. It starts when the PoC server state for general talk burst transits to a TB_Taken state. It the speech duration timer expires, which indicates that the client having the talk burst has taken the talk burst for a duration longer than a set duration, the PoC server revokes the talk burst of the client having the talk burst. When the PoC server revokes the talk burst of the client having the talk burst, the speech duration timer is disabled.

In the existing PoC service, however, the client having the talk burst does not speak but a louder external voice is treated as speech input. In this case, the speech mute timer will not start and the PoC server will not revoke the talk burst in time according to the state of the speech mute timer. Moreover, the timing duration of the speech duration timer is often long. As a result, after the client has sent a talk burst release message to the PoC server, the speech mute timer probably does not start and there is still a long time before the speech duration timer expires. In this case, the client having the talk burst needs to wait for a long time before the talk burst is revoked.

In PoC applications, when a client having the talk burst initiatively releases a talk burst so that the talk burst is in a pending release state, existing conditions for revoking the talk burst of the client having the talk burst include: the speech mute timer expires, the speech duration timer expires or the PoC server receives a media packet from the client having the talk burst whose sequence number is equal to or greater than the maximum sequence number of media packets sent by the client having the talk burst previously.

However, when an existing condition for revoking the talk burst of the client having the talk burst is met, the talk burst of the client may be revoked in time or revoked after long-time waiting. As such, clients may have poor experience when using the PoC service or even misunderstand that the PoC service does not allow initiative release of a talk burst.

In addition, the PoC service may be charged in accordance with the speech duration of clients. After the client initiatively releases a talk burst, it the PoC server does not revoke the talk burst of the client in time, the speech duration of the client is extended passively. This brings unnecessary and unacceptable call charges to clients and restricts the deployment and application of the PoC service.

SUMMARY OF THE INVENTION

An embodiment of the present invention provides a method and apparatus for revoking a talk burst, which enables the talk burst to be revoked in time after a client having a talk burst releases the talk burst initiatively so that the talk burst enters a pending release state.

A method for revoking a talk burst includes:

entering a pending release state by a talk burst after a client having the talk burst releases the talk burst initiatively;

monitoring a duration of the talk burst in the pending release state;

revoking the talk burst when the duration of the talk burst in the pending release state exceeds a preset duration.

An apparatus for revoking a talk burst includes a control module and a duration monitor module, wherein the control module, adapted to send a start signal to the duration monitor module when a talk burst enters a pending release state, and to revoke the talk burst after receiving an expiry signal from the duration monitor module;

the duration monitor module, adapted to receive the start signal from the control module, start monitoring a duration of the talk burst in the pending release state, and send the expiry signal to the control module it the duration of the talk burst in the pending release state exceeds a preset duration.

It can be seen from the preceding solutions that, in an embodiment of the present invention, a duration of a talk burst in a pending release state is monitored after the client having the talk burst initiatively releases the talk burst so that the talk burst enters the pending release state. It the duration of the talk burst in the pending release state exceeds a preset duration, the talk burst of the client is revoked so that the talk burst is revoked in time after the client having the talk burst initiatively releases the talk burst. This avoids long-time waiting and makes clients have better experience of the PoC service.

In the case that the PoC service is charged in accordance with the speech duration of clients, after a client initiatively releases a talk burst, the PoC server can revoke the talk burst of the client in time, thus avoiding unnecessary call charges and promoting the deployment and application of the PoC service.

In addition, embodiments of the present invention are easy to implement because only a duration monitor module is added to the PoC server and other aspects of the existing PoC service are not affected.

DETAILED DESCRIPTION OF THE INVENTION

The following describes embodiments of the present invention to make clear the purpose, technical solution and advantages.

In an embodiment of the present invention, after a client having a talk burst initiatively releases the talk burst so that the talk burst enters a pending release state, the duration of the talk burst in the pending release state is monitored. When the duration of the talk burst in the pending release state exceeds a preset duration, the talk burst of the client having the talk burst is revoked.

The following describes an embodiment of the present invention in detail in accordance with an example that a timer is adopted to monitor the duration of the talk burst in the pending release state.

Figure 1:
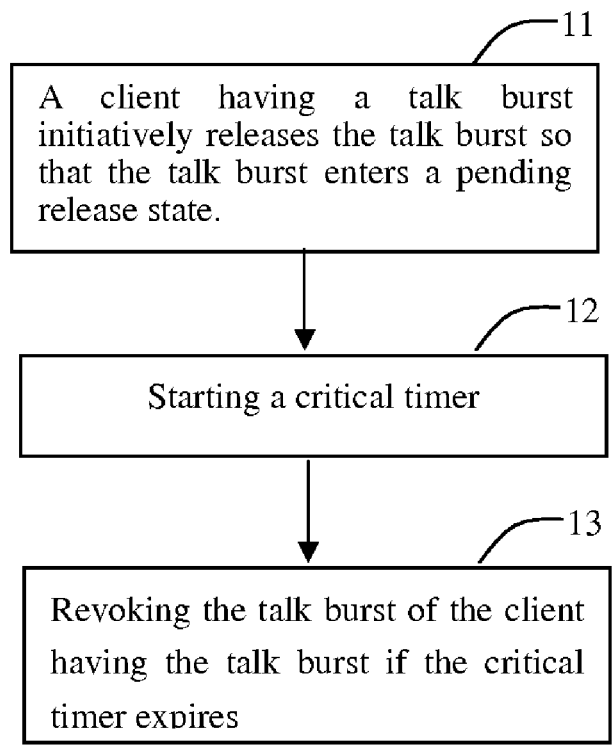
FIG. 1 is a flowchart of a method for revoking a talk burst in an embodiment of the present invention.

FIG. 1 is a flowchart of a method for revoking a talk burst in an embodiment of the present invention. In the FIG. 1, the method for revoking a talk burst includes:

Step 11: A client having a talk burst initiatively releases the talk burst so that the talk burst enters a pending release state.

The client having the talk burst initiatively releases the talk burst by sending a talk burst release message to the PoC server when using the PoC service. When the talk burst release message carries the maximum sequence number of media packets required for the speech content, the talk burst changes from a taken state to the pending release state.

When the talk burst is in the pending release state, although the client initiatively releases the talk burst, the client still has the talk burst before the PoC server revokes the talk burst of the client to make the talk burst enter an idle state.

Step 12: Starting a critical timer.

When the talk burst enters the pending release state, the PoC server starts the critical timer.

In an embodiment of the present invention, the critical timer is adapted to monitor the duration of the PoC server state for general talk burst state in the pending TB_Release state. The critical timer starts when the talk burst enters the pending release state. It the critical timer expires, which indicates that the duration of the talk burst in the pending release state exceeds the set duration after the client having the talk burst initiatively releases the talk burst, the PoC server revokes the talk burst of the client having the talk burst. When the PoC server revokes the talk burst of the client having the talk burst, the critical timer is disabled.

In the embodiment of the present invention, the state of the talk burst in the PoC server is controlled by the PoC server state for general talk burst. When the PoC server state for general talk burst changes to the pending TB_Release state, the PoC server starts the critical timer. The embodiment in which the PoC server uses a PoC server state for general talk burst to control the stat of the talk burst is only a preferred embodiment of the present invention and is not used to limit the invention. The PoC server may use other methods to control the talk burst, for example, control the talk burst directly. As long as the talk burst is in the pending release state, the PoC server will start the critical timer.

Moreover, the embodiment in which a critical timer is used to monitor the duration of the talk burst in the pending release state is only a preferred embodiment of the present invention. In application of the present invention, other modes may be used to monitor the duration of the talk burst in the pending release state, for example, a counter may be used to monitor the duration of the talk burst in the pending release state.

Before the duration of the talk burst in the pending release state is monitored, a duration may be preset and used as a maximum duration of the talk burst in the pending release state.

In an embodiment of the present invention, the timing duration of the critical timer is configurable. According to the requirements of the service, the timing duration of the critical timer is configured in accordance with the practice of common clients so that a talk burst can be revoked within a time that a client can accept after the client initiatively releases the talk burst. For example, the timing duration of the critical timer is set to 3 seconds. In other words, after initiatively releasing the talk burst, the client needs to wait for 3 seconds, which is short and acceptable to the client. A PoC operator may configure different timing durations for the critical timer, depending on specific service requirements.

Step 13: Revoking the talk burst of the client having the talk burst it the critical timer expires.

The expiry of the critical timer indicates that the waiting time has exceeded the set duration after the client having the talk burst initiatively releases the talk burst, so the PoC server revokes the talk burst of the client having the talk burst.

It the client having the talk burst continuously sends media packets with sequence numbers smaller than the maximum sequence number of media packets sent by the client having the talk burst previously, the PoC server revokes the talk burst of the client having the talk burst when the critical timer expires.

Before a client having the talk burst initiatively releases a talk burst and the talk burst enters a pending release state, the PoC server starts a speech mute timer when the talk burst is in a taken state and the client having the talk burst does not input any speech. It the speech mute timer has not expired yet, the PoC server releases the talk burst of the client having the talk burst when the critical timer expires.

Before a client having the talk burst initiatively releases a talk burst and the talk burst enters a pending release state, the PoC server starts a speech duration timer when the talk burst is in a taken state. It the speech duration timer has not expired yet, the PoC server revokes the talk burst of the client having the talk burst when the critical timer expires.

It can be seen that when the existing conditions for revoking a talk burst of a client having the talk burst are not met, the PoC server revokes the talk burst of the client having the talk burst it the critical timer expires. Accordingly the talk burst of the client having the talk burst can be revoked in time.

Before the critical timer expires, it an existing condition for revoking a talk burst of a client having the talk burst is met, the PoC server revokes the talk burst of the client having the talk burst and disables the critical timer.

With the preceding procedure, after a client initiatively releases a talk burst so that the talk burst enters a pending release state, the talk burst can be revoked in time and the waiting time will not exceed the timing duration of the critical timer. This effectively avoids long-time waiting as in the prior art, saves clients' time and promotes the deployment and application of the PoC service.

The following describes an apparatus for revoking a talk burst in an embodiment of the present invention in detail in accordance with an example that a timer is adopted to monitor the duration of the talk burst in a pending release state.

Figure 2:
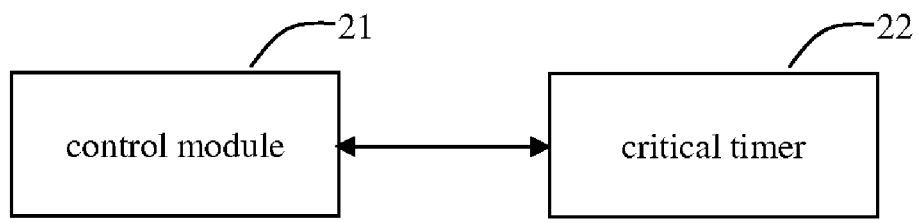
FIG. 2 is a schematic diagram showing a structure of an apparatus for revoking a talk burst in an embodiment of the present invention.

FIG. 2 is a schematic diagram showing a structure of an apparatus for revoking a talk burst in an embodiment of the present invention. As shown in FIG. 2, the apparatus for revoking a talk burst includes a control module 21 and a critical timer 22. The control module 21 and the critical timer 22 are included in a PoC server.

The control module 21 is adapted to send a start signal to the critical timer 22 when a client initiatively releases a talk burst so that the talk burst enters a pending release state, and to revoke the talk burst of the client having the talk burst upon receiving an expiry signal from the critical timer 22.

The critical timer 22 is adapted to receive the start signal from the control module 21 and start timing and to send the expiry signal to the control module 21 upon expiry.

The control module may also be adapted to configure the timing duration of the critical timer, or adapted to disable the critical timer after revoking the talk burst.

The embodiment in which a critical timer is adapted to monitor the duration of the talk burst in the pending release state is only a preferred embodiment of the present invention. In application of the present invention, other modes can be used to monitor the duration of the talk burst in the pending release state, for example, a counter may be used to monitor the duration of the talk burst in the pending release state.

By applying the apparatus in an embodiment of the present invention, the talk burst can be revoked in time after the talk burst enters the pending release state. The client need not wait for a time longer than the timing duration of the critical timer. In the case that the PoC service is charged in accordance with the speech duration of clients, unnecessary call charges will not be generated. Thus the deployment and application of the PoC service can be promoted. In addition, embodiments of the present invention are easy to implement because only a critical timer is added in the PoC server and other aspects of the existing PoC service are not affected.

It should be appreciated that the above are only exemplary embodiments of the invention and are not used for limiting the invention. Any modification, equivalent substitution, and improvement without departing from the spirit and principle of this invention should be covered in the protection scope of the invention.

What is claimed is:

1. A method for revoking a talk burst, comprising:
making the talk burst enter a pending release state after a client having the talk burst releases the talk burst initiatively;
monitoring a duration of the talk burst in the pending release state;
before the duration of the talk burst in the pending release state exceeds the preset duration, revoking the talk burst if a sequence number of a media packet received from the client is equal to or greater than a maximum sequence number of media packets sent by the client previously, or if a speech mute timer expires; and
revoking the talk burst no later than when the duration of the talk burst in the pending release state exceeds a preset duration.

2. The method of claim 1, wherein the monitoring a duration of the talk burst in the pending release state comprises starting a timer to monitor the duration; and
wherein the duration of the talk burst in the pending release state is measured by a counted time of the timer.

3. The method of claim 2, further comprising:
disabling the timer after the talk burst is revoked.

4. The method of claim 1, further comprising starting a speech duration timer; and
before the duration of the talk burst in the pending release state exceeds the preset duration, revoking the talk burst if the speech duration timer expires.

5. An apparatus for revoking a talk burst, comprising a control module and a duration monitor module, wherein,
the control module, adapted to
send a start signal to the duration monitor module when the talk burst enters a pending release state,
revoke the talk burst if a sequence number of a media packet received from a client having the talk burst is equal to or greater than a maximum sequence number of media packets sent by the client previously or if a speech mute timer expires, and
revoke the talk burst when receiving an expiry signal from the duration monitor module at the latest;
the duration monitor module, adapted to
receive the start signal from the control module,
start monitoring a duration of the talk burst in the pending release state, and
send the expiry signal to the control module if the duration of the talk burst in the pending release state exceeds a preset duration.

6. The apparatus of claim 5, wherein the duration monitor module is a timer.

7. The apparatus of claim 6, wherein the control module is further adapted to configure the timing duration of the timer.

8. The apparatus of claim 6, wherein the control module is further adapted to disable the timer after the talk burst is revoked.

* * * * *